Patented May 12, 1931

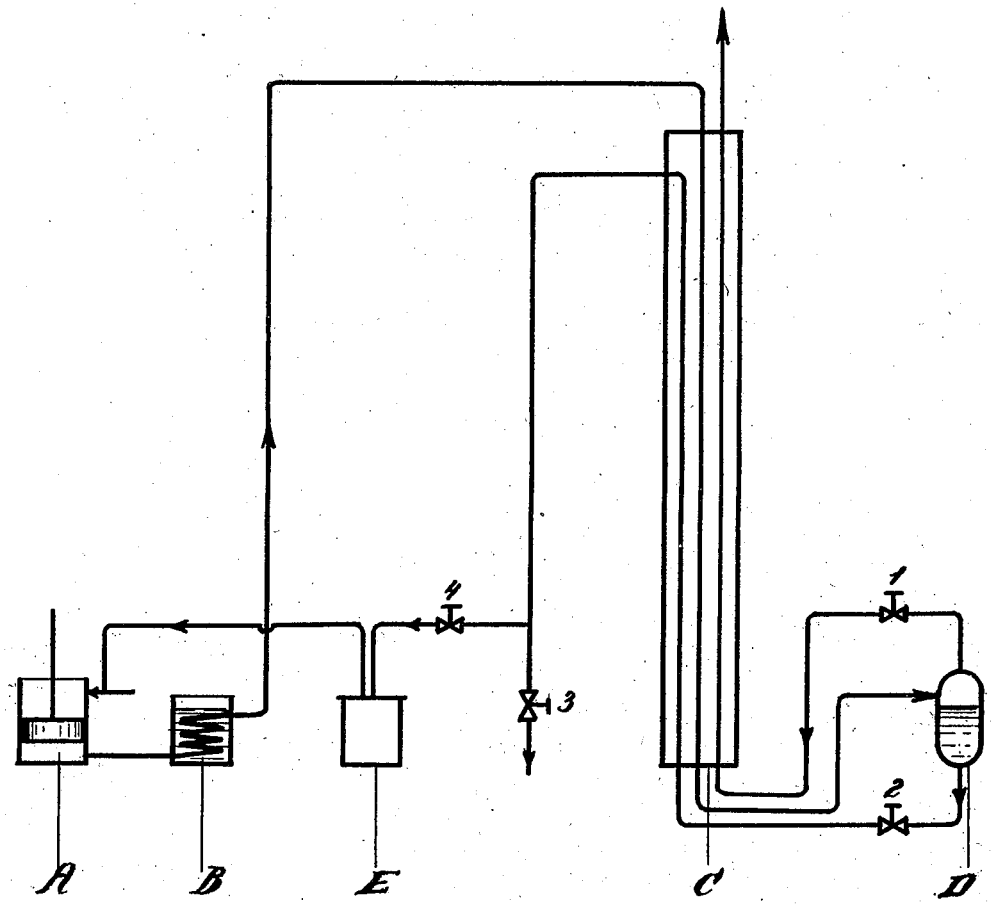

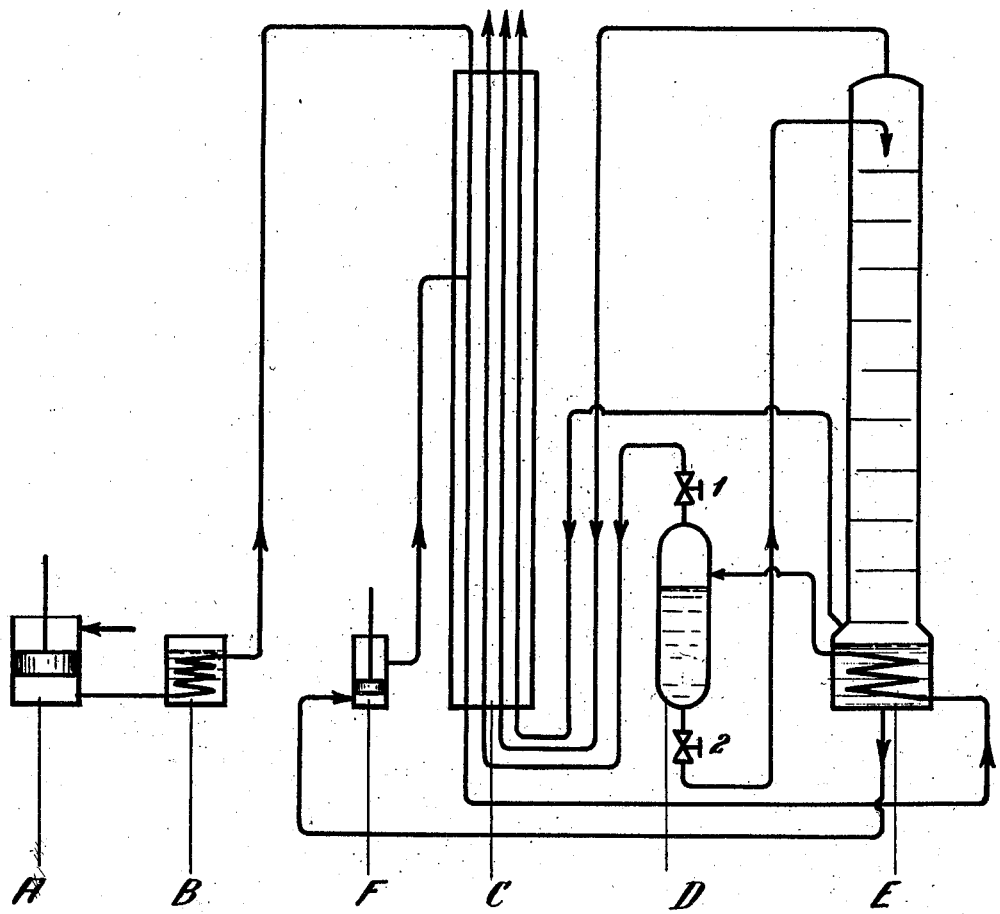

1,804,432

UNITED STATES PATENT OFFICE

FRANZ POLLITZER, OF SOLLN, BY MUNICH, GERMANY

PROCESS OF FRACTIONATING, COOLING, AND CONDENSING GAS MIXTURES

Application filed May 10, 1924, Serial No. 712,452, and in Germany May 31, 1923.

This invention refers broadly to a method of cooling and condensing gaseous mixtures and of separating out and obtaining various valuable constituents thereof by such treatment. In the splitting up or fractionation of gas mixtures by a partial or complete liquefaction, and with or without subsequent rectification considerable inconveniences have to be overcome in the case of any constituents separating out in solid condition in consequence of the necessary cooling down to low temperatures, such condensation or cooling products choking up the tubes and pipe connections of the heat exchange apparatus, the valves and rectifying means. In view thereof, it has been necessary heretofore to either eliminate the ingredients, liable to be separated out in the solid condition, before allowing the gas to enter the liquefying means, such elimination being preferably effected by chemical means, or it was necessary to heat the mixture of the constituents separated out in the solid and liquid condition, to such an extent before allowing them to expand that all the separated substances are converted into the liquid state. The preferably chemical method, first referred to, which is employed for instance in the liquefaction of air for the purpose of removing the carbon-dioxide involves considerable difficulties and costly consumption of absorbents, while the latter process which is employed in the fractionating of illuminating gas, entails a rather appreciable complication of the liquefying apparatus, and is only applicable within the limits determined by solubility and vapor pressure.

Now, in the course of researches relating to these questions is has been ascertained that certain mixtures of gases with a considerable percentage of constitutents the solidification points of which are far above the lowest temperatures to which the mixture has been cooled down, may be directly liquefied without giving rise to any disturbances by the elimination of solid substances. The cause of this behavior according to the researches has been found to be due to a very considerable degree of solubility of the solid constitutents in such components of the original gas mixture, as are separated out in the liquid condition. Other solubility questions, formation of eutectics and the like, may also be of some influence in this connection. By further investigations it has been ascertained in particular that the liquefied hydrocarbons of the methane, ethylene, and aceylene-series possess a very considerable mutual solubility.

It has been found, moreover, that even substances of absolutely different chemical properties, such as carbon-dioxid and hydrocarbons are soluble in each other, so that solid carbon-dioxid may also dissolve in a large measure in methane, propane, or propylene.

The process forming the subject of this invention is substantially based upon the observations referred to. The process in its essential features consists in preventing the separation of solid constituents by the presence or simultaneous use of liquid portions, capable of dissolving the solid constituents. In view thereof, in the practice of my invention, care should be taken that a sufficient amount of liquid constituents is always present in the gas mixture in the range of temperature within which the condensation of ingredients takes place below their points of solidification, so as to retain such solid constituents in solution.

In the practical execution of the process according to the invention a distinction should be made between the cases in which the original gas mixture already contains sufficient constituents possessing the required solubility, and those cases in which such constituents are either not contained at all in the crude gas or not in sufficient concentration. In the case first presented the process of liquefaction is initiated by causing the constituents serving as solvents to be separated out from the gas mixture substantially at the same time with the fractions condensed in the solid state. By changing the pressure under which the gas mixture is treated, as well as the velocity with which the mixture passes through the different cooling stages, it becomes possible to modify within wide limits the ranges of temperature within which the several constituents of the mixture are condensed. The higher the working pressure, the more the partial pressure of the several constituents will likewise be increased and the temperatures will also be correspondingly increased at which the condensation of the constituents is started and is substantially terminated. The velocity with which the material under treatment passes through the different ranges of temperature may also be changed within wide limits by a corresponding adjustment of the cooling surfaces and the temperatures of the cooling fluids. By this means elimination of appreciable quantities of the constituents condensed below their points of solidification takes place only in the event that the constituents serving as solvents have been previously obtained in sufficient quantities in the liquid state by a previous or substantially simultaneous condensation, so as to be able to keep the constituents first mentioned in solution.

In the case of a gas mixture not having sufficient constituents which are deposited in the liquid state to keep those constituents in solution which are to be eliminated below their points of solidification, a sufficient quantity of one or more constituents of sufficient dissolving capacity is added to the original mixture. It is of particular advantage in this connection to select such substances as are met with in the original mixture, and to increase the percentage of such constituents by causing them in part to re-enter the crude gas in the inert condition after their utilization in the splitting up of the mixture. These solvents, therefore, pass through a cycle which only in the first minutes after the starting of the pieces of apparatus constitute a withdrawal of products of separation, while in the inert, otherwise unaltered condition, it however merely produces an increase of the concentration of the particular constituents in the crude gas.

For the purpose of performing this cycle of operations the most simple procedure consists in first heating the products of fractionation which are of importance in this connection to the temperature of the room in counter-current flow to the mixture to be split and then introducing the desired amount of such fractionation products into the conduit carrying the crude gas mixture before the compression. Another method consists in raising a portion of the cold fractionating products in the liquid state with the aid of a liquid pump or by means of a pressure vessel or the like directly to the pressure of the crude gas mixture, and then injecting such portion at the proper point into the conduit of the correspondingly previously cooled crude gas.

The process according to this invention makes it possible to also cool down such gas mixtures as contain comparatively larger amounts of constituents with high points of solidification to any desired low temperatures, while avoiding deposits in solid condition. It, therefore, becomes possible to distend or cause to expand the gas mixture ordinarily under a higher pressure down to a lower pressure, by causing it to flow through a valve without any risk of causing choking up in the expansion valve or in the adjoining parts of the apparatus. The process resulting therefrom is particularly distinguished by great simplicity in regards to the processes heretofore in use. Among the various practical applications of the process I may mention its utilization in the case of gas mixtures containing carbon-dioxid besides hydrocarbons where it becomes of great practical importance. In such mixtures the carbon-dioxid contained therein has been quantitatively removed heretofore before submitting the mixture to liquefaction in order to prevent choking up of the apparatus by the carbon-dioxid being precipitated in the solid condition. The complete removal of the carbon-dioxid is effected by causing it to be absorbed in sodium hydroxide or potassium hydroxide, and in the case of gases with a high content of $CO_2$ a preliminary washing with water under pressure has been resorted to with a view of diminishing the consumption of hydroxide. The expense for the complete absorption of the carbon-dioxide by such method of working is still very considerable, and amounts frequently to more than one fifth ($\frac{1}{5}$) of the entire working expenses.

By the utilization of the process according to this invention the absorption of the carbon dioxide in the gas mixture to be treated may either be entirely omitted or it will be satisfactory to remove the greater amount of the $CO_2$, leaving but a few tenths of one per cent, which method may be carried out by means of pressure water with facility and at a comparatively low expense. If provision is made for the presence of a sufficiency of dissolving hydrocarbons, the mixture may be fractionated by liquefaction without fear of separation of solid carbon-dioxide, the larger portion of the carbon-dioxid being then obtained in admixture with the eliminated hydrocarbons, ethane, propane, and so on. Whenever required the elimination of the carbon-dioxid from this mixture may be effected with considerably less costs in view of the fact that the concentration of $CO_2$ is high, while the total gas volume to be purified is small.

It should, of course, be understood that the description of the invention hereinbefore given should not be regarded as a limitation therefore, but merely by way of exemplification of means of carrying the principles thereof into effect, and it should be pointed out that changes and modifications may occur to better adapt the invention to existing or varying conditions of application and to the convenience of the operator and without deviating from the spirit of the invention, as particularly set forth in the claims hereunto annexed.

In the accompanying drawings:

Figure 1 is a diagrammatic view of an embodiment of my invention.

Figure 2 is a similar diagram of a modified form.

As an example, a coke oven gas is assumed in this case; this gas is compressed in the compressor A (Figure 1); it is cooled in the cooler B to the temperature of the cooling water and thereupon further cooled in the counter current cooler C by means of the cold disintegration products running in counter direction and it is partly condensed. The condensate collecting in the separator D would consist principally of the higher hydrocarbon of the methane and ethylene groups as well as of carbon dioxide. Carbon dioxide by itself separates below $-78.5°$ C. in solid form and would give rise to the well known disturbances of the process. The segregation in solid form is here prevented by dissolving the carbon dioxide in the mixture of the previously or simultaneously segregated hydro-carbons.

The gas which remains after segregating the condensable substances, is released from its pressure by the pressure releasing device 1 (throttle valve or expansion machine) for the purpose of producing the low temperature necessary for the separation process, and is returned to the counter current device.

In case the quantity of the substances which is contained in the original gas mixture and which serves as a solvent for the carbon dioxide should not be sufficient, it is increased by the return into the suction line of the compressor A of a portion of the hydrocarbons separated in the separator D. The condensate is for this purpose freed of pressure by means of the regulating valve 2 and after reevaporation and heating in the counter current device C it is divided into two portions by means of the regulating valves 3 and 4, of which one portion, after the carbon dioxide has been removed for instance through watery sodium lye in scrubber E, is added to the gas drawn by the compressor A.

The second form of the process is illustrated in Figure 2. In this figure the elements A—D are the same as those shown in Figure 1. In this case, however, as an example of a further separation a rectification column E is shown beyond the separator D in which occurs the separation of the heavy hydrocarbons serving as solvents, from the dissolved carbon dioxide as well as from the hydro-carbons of lower boiling point which are then suitable as solvents. This column may be for example heated by the warmer coke gas. The substances of lower boiling point, such as ethane and ethelene, which contain the whole carbon dioxide are removed at the top of the column into the counter current device, whereas the solvents of higher boiling point, such as propane and propylene, collect as a liquid at the bottom of the column. By the small liquid pump F a portion of the liquid is injected into the counter current device. The portion of the separation products which corresponds to the quantity supplied to the process by the fresh gases is conducted as vapor into the counter current device, and is reheated and collected.

In both processes the quantity of the hydrocarbons carried in the circuit and serving as solvents may be measured so that a remaining gas is obtained which is practically free of carbon dioxide. If this gas is further separated, which requires cooling to still lower temperatures, therefore stoppages by segregation by solid carbon dioxide are not to be feared.

Naturally the process is not limited to the gas mixture chosen in the present example, but it may be used in similar manner for the cooling and condensation of any gas mixture which contains admixtures having a high temperature solidification point.

It will be seen that the method involves the choosing of the total or gauge pressure so as to cause the gaseous hydrocarbons to liquefy in the same range of temperature at which the other constituents would have solidified except for the presence of the liquefying hydrocarbons which in this case keep them dissolved.

I claim:—

1. A method of cooling gaseous mixtures below the temperature of solidification of constituents thereof consisting in adding to the original mixture gases capable of acting in the liquid state as solvents for the constituents first-mentioned, compressing the total mixture and cooling it, choosing the total pressure so as to cause the added gases to liquefy in the same range of temperatures in which the first-mentioned constituents, at their partial pressures in the gaseous mixture, might solidify, using the liquid condensate as a solvent for the other condensed constituents, preventing thus the solidification of the latter, separating the liquid solution from the residual gas, vaporizing it, eliminating the constituents of high melting point and returning the purified constituent to the original gas mixture.

2. A method of cooling gaseous mixtures containing carbon-dioxide below the solidification temperature of the latter, consisting in adding to this mixture hydrocarbons, compressing the mixture, cooling the gas and choosing the total pressure so as to cause the hydrocarbons of the gaseous mixture to liquefy in the same range of temperatures in which the carbon-dioxide, at its partial pressure in the gaseous mixture, might solidify, using the liquid hydrocarbons as a solvent for the carbon-dioxide and preventing thus the solidification of the latter.

3. A method of cooling gaseous mixtures containing carbon-dioxide below the solidification temperature of the latter, consisting in adding to this mixture hydrocarbons, compressing the gas, cooling it and choosing the total pressure so as to cause the hydrocarbons of the gaseous mixture to liquefy in the same range of temperatures in which the carbon-dioxide, at its partial pressure in the gaseous mixture might solidify, using the liquid hydrocarbons as a solvent for the carbon-dioxide and preventing thus the solidification of the latter, separating from the residual gas the liquid solution, vaporizing the latter, reheating it, eliminating the carbon-dioxide therefrom and adding the hydrocarbons, as before, to the original gas mixture, effecting a continuous cycle of hydrocarbons.

4. A method of cooling gaseous mixtures containing carbon-dioxide below the solidification temperature of the latter, consisting in compressing the gaseous mixture, subjecting it to a preliminary purification from the main portion of carbon-dioxide up to a few tenths percent of carbon-dioxide, adding to the gas hydrocarbons and cooling the total mixture, choosing the total pressure so as to cause the hydrocarbons of the gaseous mixture to liquefy in the same range of temperatures in which the carbon-dioxide, at its partial pressure in the gaseous mixture, might solidify, using the liquid hydrocarbons as a solvent for the carbon-dioxide and preventing thus the solidification of the latter.

5. A method of cooling gaseous mixtures containing carbon-dioxide below the solidification temperature of the latter, consisting in adding to the gas hydrocarbons, compressing the gaseous mixture, subjecting it to a preliminary purification from the main portion of carbon-dioxide up to a few tenths percent of carbon-dioxide, cooling the total mixture, choosing the total pressure so as to cause the hydrocarbons of the gaseous mixture to liquefy in the same range of temperatures in which the carbon-dioxide, at its partial pressure in the gaseous mixture, might solidify, using the liquid hydrocarbons as a solvent for the carbon-dioxide and preventing thus the solidification of the latter, separating from the residual gas the liquid solution, vaporizing it, reheating it, eliminating the carbon-dioxide therefrom and adding the hydrocarbons again to the gas mixture after the preliminary purification of the latter as above described.

In testimony whereof I affix my signature.

DR. FRANZ POLLITZER.